July 17, 1962 F. C. BADALICH 3,044,198
PROJECTION OF SLIDES
Filed Jan. 12, 1959 4 Sheets-Sheet 2
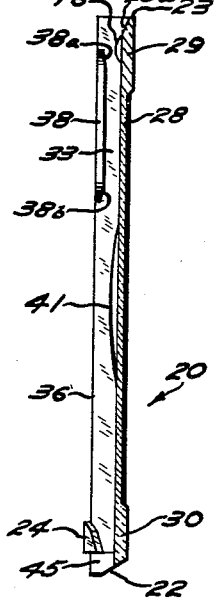
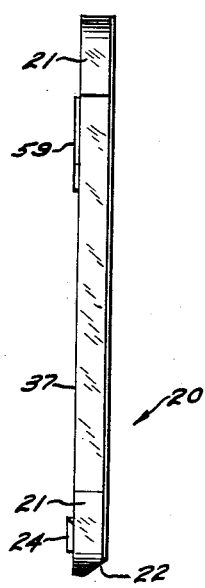
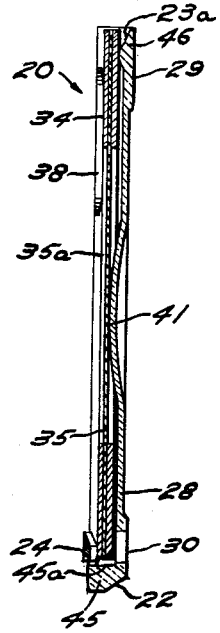
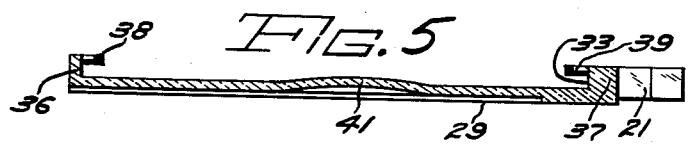
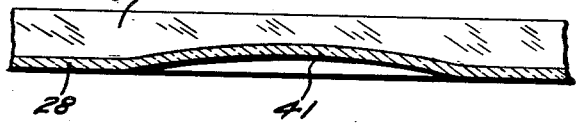
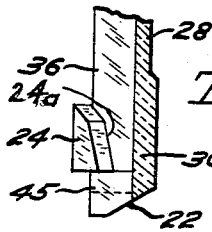
Inventor
Frank C. Badalich
By Robert F. Miehle
Atty.

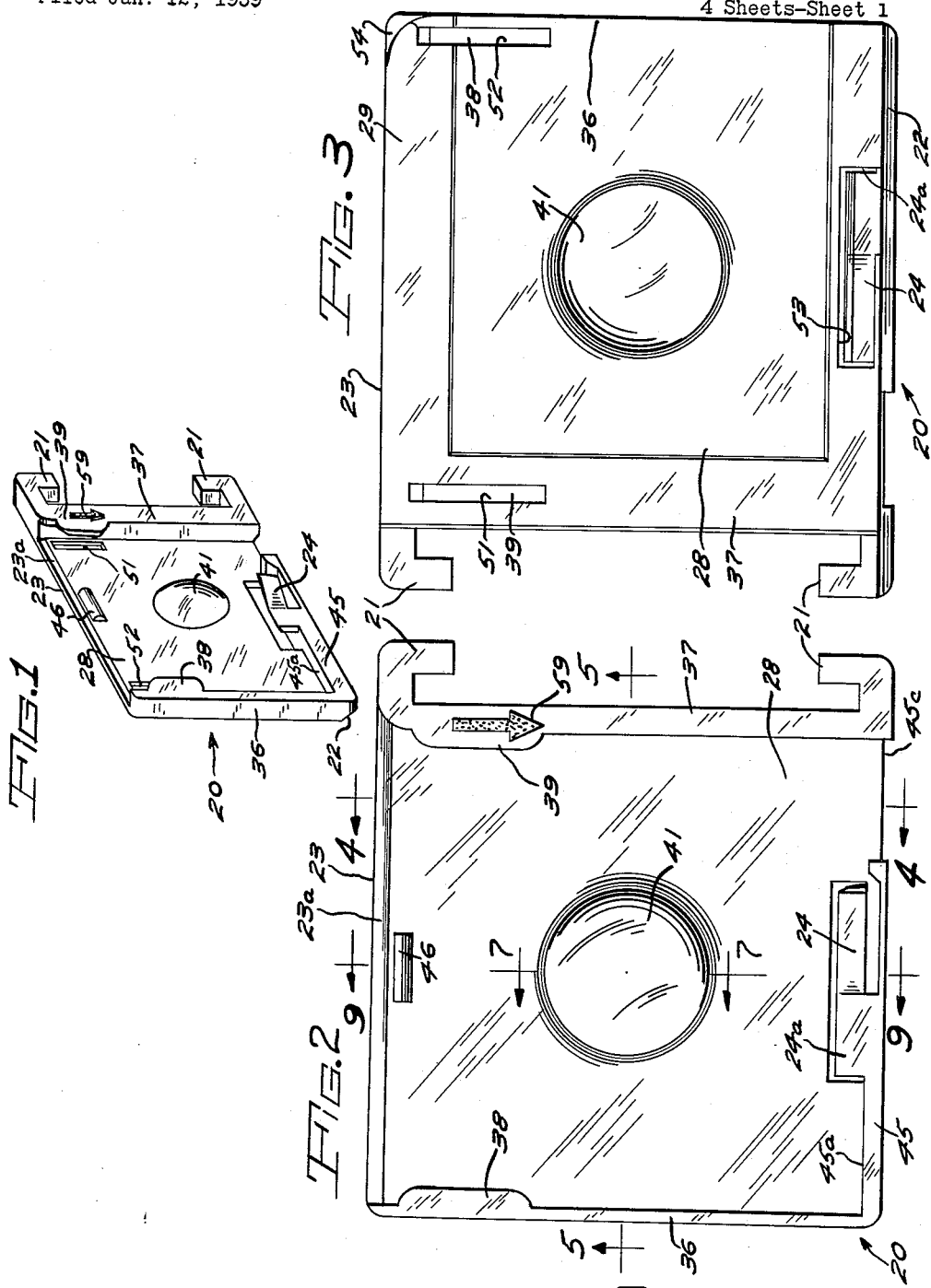

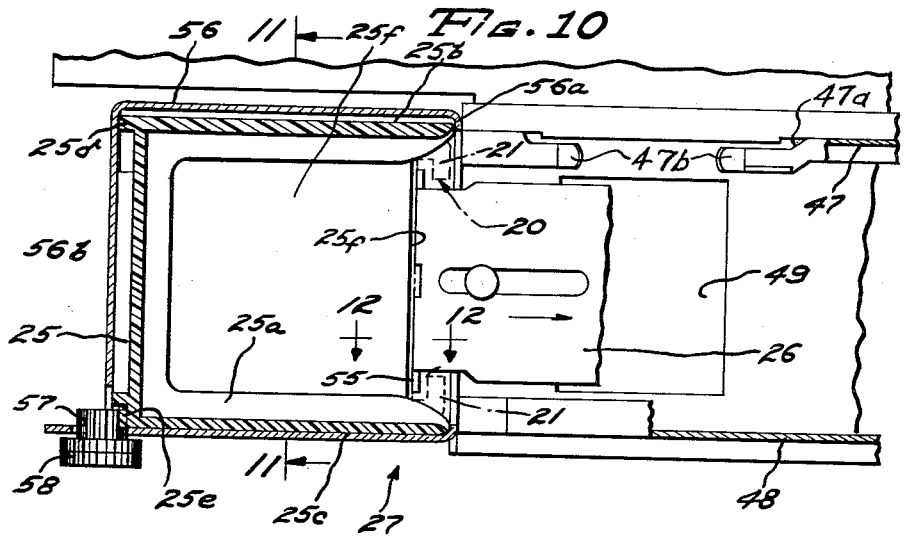
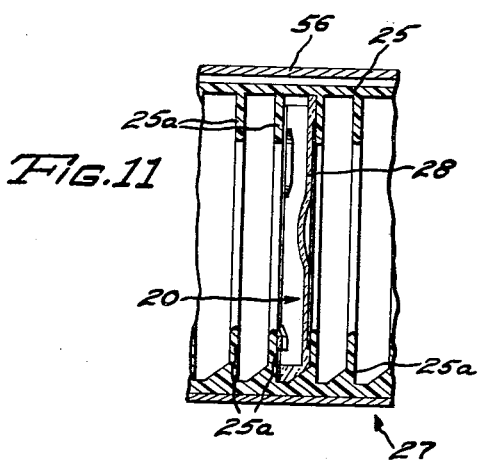
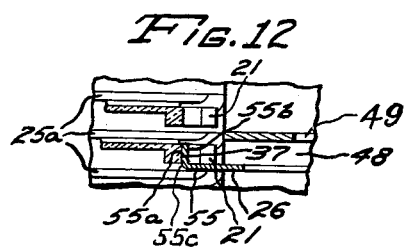
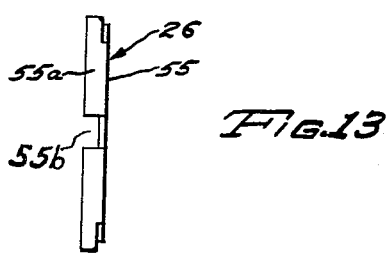

July 17, 1962 F. C. BADALICH 3,044,198
PROJECTION OF SLIDES
Filed Jan. 12, 1959 4 Sheets-Sheet 4
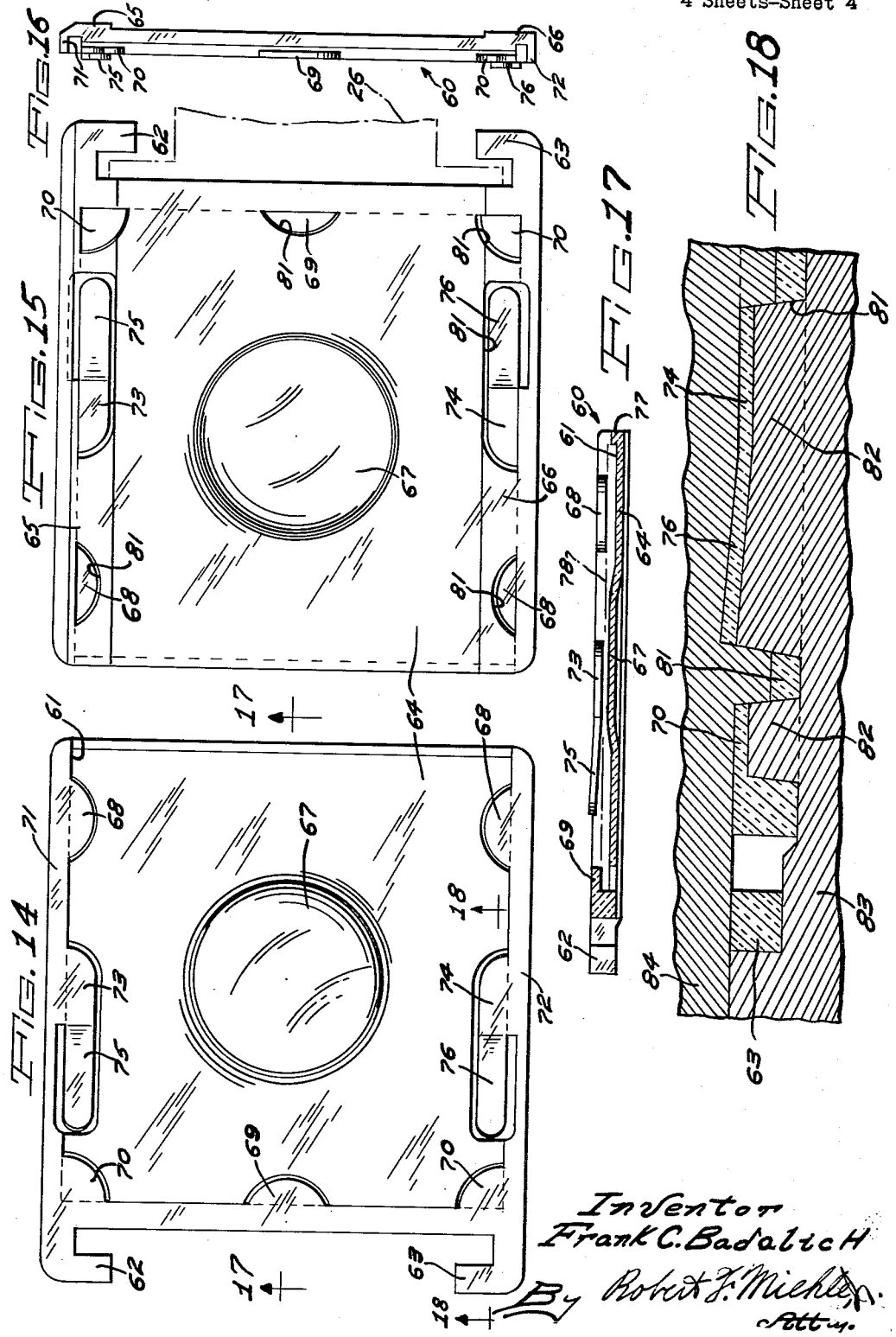
Inventor
Frank C. Badalich
By Robert F. Miehle
Atty.

United States Patent Office 3,044,198
Patented July 17, 1962

3,044,198
PROJECTION OF SLIDES
Frank C. Badalich, Chicago, Ill., assignor to Bell & Howell Company, Chicago, Ill., a corporation of Illinois
Filed Jan. 12, 1959, Ser. No. 786,199
6 Claims. (Cl. 40—79)

This invention relates to the projection of slides, and more particularly to a slide holder and slide tray together with a slide changer mechanism and a method of and apparatus for molding the slide holder.

An object of the invention is to provide new and improved slide holders and methods of and apparatus for making the same.

Another object of the invention is to provide slide holders covering slides to keep dust from the slide.

Another object of the invention is to provide slide holders permitting editing of the slides during projection of the slides by slide projectors.

Another object of the invention is to provide a slide holder which permits insertion of a slide mount without rubbing the mount and slide on the slide holder.

A further object of the invention is to provide a slide holder which retains itself in a slide tray and which may be inserted into the tray in only one position.

Another object of the invention is to provide a slide holder for covering mounted slides together with a tray open at only one side thereof and a slide changer mechanism adapted to pull the slide holder out of the tray into a slide projector and push the slide holder back into the tray.

Yet another object of the invention is to provide a slide holder having at one corner thereof a pushing and pulling portion which may be engaged by a changer mechanism together with spring means engaging a slide tray at a point substantially in alignment with the direction of the force of the changer mechanism on the slide holder.

Further objects and features of the invention will be apparent from the following detailed description of slide holders forming specific embodiments thereof, when read in conjunction with the appended drawings, in which:

FIG. 1 is a perspective view of a slide holder forming one embodiment of the invention;

FIGS. 2 and 3 are front and rear elevation views, respectively, of the slide holder of FIG. 1;

FIG. 4 is an enlarged vertical sectional view taken along line 4—4 of FIG. 2;

FIG. 5 is an enlarged horizontal sectional view taken along line 5—5 of FIG. 2;

FIG. 6 is a side elevation view of the slide holder of FIG. 1;

FIG. 7 is an enlarged fragmentary vertical section of the slide holder of FIG. 1 taken along line 7—7 and turned ninety degrees;

FIG. 8 is an enlarged fragmentary vertical sectional view of the slide holder of FIG. 1;

FIG. 9 is an enlarged vertical sectional view taken along 9—9 of FIG. 2 with a slide mount in the slide holder.

FIG. 10 is a fragmentary vertical section of a slide holder, a slide tray and a slide changer mechanism forming another embodiment of the invention;

FIG. 11 is an enlarged, fragmentary, vertical sectional view taken along line 11—11 of FIG. 10;

FIG. 12 is an enlarged, fragmentary vertical sectional view taken along line 12—12 of FIG. 10;

FIG. 13 is an enlarged side elevation view of a portion of the slide transport mechanism shown in FIG. 11;

FIG. 14 is a front elevation view of a slide holder forming an alternate embodiment of the invention;

FIG. 15 is a rear elevation view of the slide holder of FIG. 14;

FIG. 16 is a side elevation of the slide holder of FIG. 14;

FIG. 17 is a horizontal sectional view taken along line 17—17 of FIG. 14; and

FIG. 18 is a sectional view taken along line 18—18 of FIG. 14 and showing a molding apparatus forming one embodiment of the invention.

The invention provides the novel combination of a slide holder for holding a slide together with a tray open at one side and a slide changer mechanism adapted to pull the slide holder out of the tray to a projection station and push the holder back into the tray. Preferably a hook-shaped notch at the bottom corner portion thereof for receiving a hook portion of an actuator which pulls the holder from the tray, and the tray or the holder may be provided with spring means adjacent to the bottom edge of the holder to create a frictional force between the holder and the tray to resist movement of the holder relative to the tray.

The invention also provides a novel slide holder adapted to receive a card mounted slide. The holder preferably is of one piece and has a T-shapted slot at one edge portion thereof for receiving the complementary portion of the slide changer to interlock therewith and prevent disengagement of the holder and actuator except by relative facewise movement between the holder and actuator. The holder may include a transparent panel covering the slide. In one form of the invention, the slide holder has a guideway open at the top for insertion of and removal of a slide mount into and from the holder while the holder is in the projecting station in the slide projector to permit editing. The guideway may include hooks or tabs positioned above a bubble portion of the panel and acting to guide the slide mount into the projector while permitting the mount to move over the bubble portion with a minimum of pressure therebetween. The slide holder also may have a slight ledge or shoulder overhanging the guideway at the mouth thereof to hold the slide mount in the guideway. The slide holder also may have an integral spring finger to hold the holder in a slide tray. The holder in one form of the invention may have a guideway opening on one end thereof for insertion of and removal of the slide mount into and out of the slide holder. The invention also contemplates the molding of the slide holder tabs and spring finger by cores projecting through openings in the opposite portions of the slide holder.

Referring now in detail to the drawings, there is shown in FIGS. 1 to 9 a slide holder 20 of one piece and formed of transparent molded plastic material such as, for example, methyl methacrylate, or ploymerized styrene. The slide holder permits insertion and removal of a slide mount 34. The slide holder includes a pair of thick, strong hooks or interlocking members 21 for pulling the holder from a tray 25 and pushing the holder back into the tray by an actuator or pulling mechanism 26 of a slide changer of a slide projector 27 disclosed and claimed in copending application Serial No. 799,404 for "A Slide Projector" and assigned to the same assignee as the instant application. The holder has a bevelled or relieved lower edge 22 (FIG. 6) and the receiving septum 25a of the tray is formed complementary thereto and the upper edge 23 of the holder is unrelieved so that the holder cannot be inserted into the tray backwards. The holder at the lower edge thereof has an integral leaf spring finger 24 projecting outwardly from the front side of the holder to press against the septum 25a to resist movement of the holder relative to the tray. Certain features of the tray are disclosed and claimed in copending application Serial No. 786,294 for "Slide Tray and Slide Holder" and assigned to the same assignee as the instant application.

The slide holder has a panel cover 28 forming the back face of the holder, and the panel is thinner than top and bottom marginal portions 29 and 30 of the panel as best illustrated in FIGS. 5 and 9, the edge portions being thick to provide strength to the holder while the panel is thin to provide a substantially negligible thickness from the optical standpoint. The holder has a guideway 33 for a cardboard slide mount 34 (FIG. 9) of known construction and mounting a transparency or film 35 having a front or emulsion side 35a. The guideway 33 is formed by the marginal portions 29 and 30 of the panel 28, side edge portions 36 and 37 of the holder and overhanging tabs 38 and 39. The tabs 38 and 39 have tapered or relieved entrance and exit portions illustrated by entrance and exit portions 38a and 38b (FIG. 4).

The tabs 38 and 39 (FIGS. 2 and 4) are located completely above a bubble or focus-locking bulge or embossment portion 41 of the panel 28 pushed forwardly of the panel 28. The surfaces of the bubble 41 have very large radii and are parallel so as to have negligible optical effect. The bubble 41 is adapted to hold the slide transparency or film 35 toward the left or front of the holder, as viewed in FIG. 9. Where the film is of the type normally bulging to the left when at room temperature the bubble prevents popping of the film to the right during projection when the film is heated by the projector light. When the film is of a slide type normally bulged to the right when unheated, the bubble prestresses or prepops the film to the left and holds it in the latter position. This eliminates the popping along with change in focus caused by the popping, the emulsion side 35a of the film already being located or stressed to the normal "popped" or heated position thereof relative to the mount and slide holder with the latter type of slide. By the location of the tabs 38 and 39 substantially above the bulge 41, the slide mount is not pressed tightly against the bulge as the slide mount is inserted into and removed from the guideway 33 so that the mount does not scratch the bulge. This is facilitated by relieved or tapered lower end portions 38a (FIG. 4) of the tabs 38 and 39 and by relieved or tapered upper edge portion 23a which permits slight tilting of the slide mount. Portion 24a of the leaf spring secured to bottom edge portion 45 of the holder 20 forms a tab at the bottom of the holder to retain the bottom portion slide mount against the panel and forms the lower end of the guideway. The upper edge 24b of the tab portion 24a is tapered or relieved to guide the lower end of the mount into position between the panel and the tab portion 24a. Also, the upper edge of the spring finger 24 may be similarly tapered and extends upwardly and outwardly from the tab portion 24a to guide the mount into position between the tab portion 24a and panel. Raised portion 45a of the bottom edge portion 45 serves to support the bottom edge of the slide mount. During insertion of the mount into the holder, a rounded bar or projection 46 is provided at the entrance edge of the guideway to tilt the lower end of the mount aganist the panel just before the lower end of the mount reaches the tab 24a, the bar 46 engaging the upper part of the mount at this time. The spacing of the tabs 38 and 39 from the panel face and the clearance portions 38a and 39a permit this tilting movement of the mount during insertion. An open portion 45c in the edge portion 45 is provided to permit removal of the mount by a hook pushing on the bottom of the mount, and provides clearance for the hook.

The slide holder 20 has openings 51, 52 and 53 in the panel portion 28 to provide for cores (not shown) for molding the inner faces of the tabs 38 and 39 and the spring finger 24. Relieved corner portion 54 (FIG. 3) is provided to facilitate insertion of the slide holder into the guideway formed by the septums 25a of the tray 25.

The thick marginal portions 29 and 30 of the panel 28 project laterally beyond the thin portion of the panel, as best illustrated in FIGS. 3 and 9 to define a frame, and act as guide bars as the slide holder is slid into and out of the tray and into and out of channel-like guideways 47 and 48 in the slide projector 27 to and from a projecting station 49. The thin central portion of the panel bordered by the marginal portions 29 and 30 and the thick portion adjacent the edge portion 37 is kept out of contact with the guideway of the projector and the septum walls of the tray by the thickened overhanging or projecting marginal portions 29 and 30. This not only reduces friction but also prevents rubbing of the thin portion of the panel which is the only portion thereof through which the light of the projector travels and is slightly more than coextensive with the transparency 35. The panel covers the transparency to keep dust therefrom as well as locking the transparency in a focus position. The slide holder 20 has a slightly raised textured arrow portion 59 (FIG. 2) to indicate the direction of insertion of the slide mount and also readily identify the top of the slide holder.

The hooks 21 in effect form notched extensions of guide bar portions 29 and 30 and define a T-shaped slot with the edge portion 37 for receiving T-shaped end portion 55 of the actuator 26 substantially complementary in shape to the T-shaped slot. The end portion 55 is T-shaped in elevation as shown in FIG. 10 but is L-shaped as viewed from the top (FIG. 12) to provide a pushing face 55a and a pulling face 55b. The pushing face 55a engages substantially the entire length of the edge portion 37 in pushing the slide holder, while in pulling the end or tab portions engage the hook ends 21. Thus, edgewise, the actuator 26 positively interlocks with the slide holder to prohibit edgewise cocking and the actuator permits only facewise movement of the slide holders relative to the actuator. In order to prevent edgewise cocking of the slide holder it is preferable to have both the opposed hooks 21. However, the positive interlocking effect may also be effected by having the upper hook 21 removed and leaving the lower hook 21 which projects from the bottom guide bar 30 at which the spring finger 24 is located so that the pull on the lower hook is resisted by friction between the spring finger and the tray to prevent cocking of the holder from the frictional pull, which is substantially directly in line with the pull on the lower hook 21 from the actuator, the upper edge 29 of the slide travelling freely relative to the tray with very little frictional force therebetween. That is, the frictional retarding force of the tray on the lower guide bar 30 is at least several times greater than the slight frictional force between the tray and the upper guide bar 29. Hence, if only the lower hook 21 were present, there would be no tendency for the slide holder to cock from pull on the lower hook.

The end portion 55a of the actuator 26 has a relieved portion or opening 55 (FIG. 13) to provide clearance for a slight sprue projection (not shown) which may be present on the edge 37 of the slide holder 20. The upper guideway 47 (FIG. 10) has an opening 47a at the projection station to permit the slide mount 34 to be pulled upwardly out of the holder 20 and reinserted for editing when the holder is at the projection station. The opening 47a is shorter than the slide holder and the guideway 47 holds the slide holder against movement of the slide holder with the mount 34 when the mount is withdrawn from the slide holder. Tabs 47b aid in holding the slide holder in the guideway while permitting the mount 34 to be grasped by a user. The actuator 26 is urged toward the left by its drive and is positively limited by stop means (not shown) on the guideways 47 and 48 to the position shown in FIGS. 10 and 12 in its movement to the left, in which position the slide holders move freely past the actuator in a facewise direction. Both the edges of the end portion 55 may be rounded as the one edge 55c is rounded to facilitate this movement of the slide holders past the actuator.

As best illustrated in FIGS. 4 and 8, the tab 24a and spring finger 24 are thicker at the bottom than at the top to facilitate entry of the slide mount 34 between the tab and the panel. The greater thickness of the tab 24a at the bottom where it joins with the edge 45 also strengthens the tab 24a. To insure that the slide holder 20 is oriented in a position facing forwardly when at the projection station, the lower guideway 48 preferably is complementary to the bevelled asymmetrical lower edge 22 of the slide holder, cross-sectional shape of the lower guideway being similar to the lower portions of the septums 25a which are illustrated in FIG. 11. The guideway 48, in effect, forms a continuation of the guideway formed by the lower portions of those septums aligned with the guideway 48. Thus, the slide holder 20 cannot be inserted into the guideways 47 and 48 except in the position thereof correct for projection.

The tray 25 is open only on the righthand side thereof as viewed in FIG. 10, and has top and bottom portions 25b and 25c which project slightly beyond the hooks 21 to protect the hooks and act as guide rails by engaging a wall 56a of a guide tunnel 56. Corner guide portion 25d of the tray engages wall 56b of the guide tunnel 56. The tray has a rack portion 25e by which a pinion 57 driven by a reversible ratchet mechanism 58 moves the tray along the guide tunnel 56. The ratchet mechanism 58 is disclosed fully in the above-mentioned copending application Serial No. 799,404 and turns the pinion 57 to move the tray only while the actuator is in its furthermost position to the left as shown in FIG. 10 in which the T-shaped end 55 of the actuator 26 is aligned with the T-shaped slot formed by the hook portions 21 of the slide holders 20 which permits free movement by the tray of the slide holders past the actuator 26.

The tray 25 has end portions 25f which do not extend so far to the right as the top and bottom portions 25b and 25c. In effect, the end portions 25f are relieved at the open side of the tray sufficiently to permit the end portions 25f of the tray to move freely past the end portion 55 of the actuator 56 in inserting the tray into the tunnel or removing the tray from the tunnel.

A slide holder 60 (FIGS. 10 to 13) forming an alternate embodiment of the invention is generally similar to the slide holder 20. However, the holder 60 has a guideway 61 opening at the righthand end of the holder, as viewed in FIG. 10, rather than the top as in the holder 20. The holder 60 has hook portions 62 and 63 for pulling and pushing the holder, and also includes a recessed panel 64 with thick guide bar portions 65 and 66. The panel has a prestressing bulge or projection 67 and side tabs 68, end tab 69 and corner tabs 70 which form the guideway 61 with the panel, and edge portions 71 and 72 and tab portions 73 and 74 supporting leaf spring fingers 75 and 76. An overhanging ledge or lip 77 at the entrance end of the holder permits the slide mount to be inserted therepast while slightly flexed and then prevents accidental sliding of the mount back out of the holder, the tabs 68 holding the mount against the panel so that the ledge 77 overhangs the end of the mount as illustrated in FIG. 13.

Referring to FIGS. 11 and 14, the holder 60 has openings 81 in the thickened edge portions directly opposite the tabs 68, 69 and 70 and the elements 73 to 76 to permit core portions 82 of a mold section 83 to mold the inner faces of the elements. The mold section 83 and mold section 84 cooperate to mold the faces of the panel 64 and the rest of the integral slide holder 60.

While the invention is thus described, it is not wished to be limited to the precise details described, as changes may be readily made without departing from the spirit of the invention.

What is claimed is:

1. In a slide holder, frame means having a pair of projecting portions at one edge thereof and having opposed notch portions facing one another to define a substantially T-shaped slot for pushing and pulling the frame means edgewise thereof.

2. A slide holder as set forth in claim 1 in which the projecting portions are continuations of the edges of the frame adjacent to said one edge.

3. A slide holder comprising a one-piece molded element of transparent plastic material, the element including a vertical panel of a predetermined thickness having a central gently curved bulge projecting from the front thereof, the element also having manipulating portions at one side edge thereof and having a frame-like edge portion substantially thicker than the panel and surrounding the bottom and side edges of the panel, the frame-like edge portion projecting laterally forward from the front face of the panel to define a recess with the panel for receiving a slide mount, the element having a pair of tabs spaced from the front face of the panel and projecting from the sides of the edge portion over the front face of the panel to guide the mount along the front face of the panel and retain the mount against the front face of the panel, the lower edge of said pair of tabs being located above the bulge of the panel whereby the lower edge of the mount may be pivoted away from the front face of the panel as the mount is slid down into the recess so as to relieve pressure between the mount and the bulge, the element also having tab means at the bottom of the edge portion spaced from and projecting over the front face of the panel to position the lower end portion of the mount against the front face of the panel.

4. In combination, a tray having an open side and a plurality of U-shaped septums extending from the edge of the top wall at said side to the edge of the bottom wall at said side, the tray having end walls being relieved at said side so that the top and bottom walls extend beyond the end walls to form guide edges, and a plurality of slide holders fitting into the tray between the septums, each slide holder having hooks projecting therefrom beyond the end walls substantially to the edges of the top and bottom walls of the tray, the hooks and the holders defining slots positioned between the edges of the end walls adjacent the open side of the tray and the edges of the top and bottom walls extending therebeyond, the portions of the septums adjacent the outer edges of the top and bottom walls being tapered to clear said slots.

5. In a slide projecting apparatus, a guideway having an apertured plate slidable therein at the rear thereof and said guideway also having a top channel and a bottom channel, a pushing and pulling member slidable along the guideway and guided by the channels and having a T-shaped end portion movable in the guideway, a slide holder having a T-shaped slot in a side edge portion thereof adapted to interlock with said T-shaped end portion and fitting slidably in a guideway in guided relationship with the guideway, and a tray having a septum for holding the slide holder in alignment with the guideway.

6. The slide projecting apparatus of claim 5 and including a tray guide extending transversely of the guideway for the pushing and pulling member and the slide holder for positioning the tray with the septum thereof in alignment with the guideway.

References Cited in the file of this patent

UNITED STATES PATENTS

| | | |
|---|---|---|
| 2,711,602 | Wiklund | June 28, 1955 |
| 2,805,503 | McKee | Sept. 10, 1957 |
| 2,810,160 | Bottleman | Oct. 22, 1957 |
| 2,823,472 | Waller et al. | Feb. 18, 1958 |
| 2,863,244 | Lyon et al. | Dec. 9, 1958 |
| 2,865,121 | Anderton | Dec. 23, 1958 |
| 2,898,807 | Ewald | Aug. 11, 1959 |
| 2,900,074 | Windman | Aug. 18, 1959 |
| 2,919,021 | Robinson | Dec. 29, 1959 |